United States Patent
Yoneya et al.

(10) Patent No.: US 7,826,019 B2
(45) Date of Patent: Nov. 2, 2010

(54) LIQUID CRYSTAL DISPLAY DEVICE USING NEMATIC LIQUID CRYSTAL AND ALIGNMENT LAYER FAVORABLE FOR LOW POWER CONSUMPTION

(75) Inventors: Makoto Yoneya, Ibaraki (JP); Hiroshi Yokoyama, Ibaraki (JP)

(73) Assignee: Japan Science and Technology Agency, Kawaguchi-shi (JP)

( * ) Notice: Subject to any disclaimer, the term of this patent is extended or adjusted under 35 U.S.C. 154(b) by 241 days.

(21) Appl. No.: 12/064,987

(22) PCT Filed: Aug. 14, 2006

(86) PCT No.: PCT/JP2006/316013

§ 371 (c)(1),
(2), (4) Date: Feb. 27, 2008

(87) PCT Pub. No.: WO2007/026535

PCT Pub. Date: Mar. 8, 2007

(65) Prior Publication Data

US 2009/0279033 A1    Nov. 12, 2009

(30) Foreign Application Priority Data

Aug. 31, 2005   (JP) ............................. 2005-250756

(51) Int. Cl.
*G02F 1/1337*   (2006.01)
*C09K 19/02*   (2006.01)

(52) U.S. Cl. .................. 349/129; 349/170; 349/177

(58) Field of Classification Search .................. 349/129, 349/170, 177

See application file for complete search history.

(56) References Cited

U.S. PATENT DOCUMENTS

| | | | | |
|---|---|---|---|---|
| 6,057,817 | A * | 5/2000 | Ono et al. | 345/94 |
| 7,342,628 | B2 | 3/2008 | Kim et al. | |
| 2001/0028427 | A1* | 10/2001 | Kitson et al. | 349/123 |
| 2002/0191136 | A1* | 12/2002 | Yoneya et al. | 349/123 |
| 2003/0147033 | A1* | 8/2003 | Stalder et al. | 349/129 |

FOREIGN PATENT DOCUMENTS

| | | |
|---|---|---|
| JP | 59 78318 | 5/1984 |
| JP | 63 14123 | 1/1988 |
| JP | 8220540 | 8/1996 |
| JP | 9 113893 | 5/1997 |

(Continued)

*Primary Examiner*—Michael H Caley
(74) *Attorney, Agent, or Firm*—Oblon, Spivak, McClelland, Maier & Neustadt, L.L.P.

(57) ABSTRACT

The present invention provides a liquid crystal display device using nematic liquid crystal material with low power consumption and having a memory characteristic which can be easily fabricated with a high yield. The liquid crystal device using nematic liquid crystal material includes: a pair of substrates (1,4) with plate-like electrode layers (2,5) thereon; a liquid crystal layer interposed between the pair of substrates (1,4); and alignment layers (3,6) arranged between the liquid crystal layer and at least one of the pair of substrates (1,4). The alignment layers (3,6) include a plurality of different alignment domains having a substantially vertical direction and substantially horizontal direction to the surface of the substrate. Both of two orientation states, i.e. a substantially vertical orientation state and a substantially horizontal orientation state of the liquid crystal, are stable and have a memory characteristic in the absence of an electric field.

7 Claims, 4 Drawing Sheets

FOREIGN PATENT DOCUMENTS

| | | |
|---|---|---|
| JP | 9 146096 | 6/1997 |
| JP | 9 318960 | 12/1997 |
| JP | 10 206834 | 8/1998 |
| JP | 10 260407 | 9/1998 |
| JP | 2000 89195 | 3/2000 |
| JP | 2001 249339 | 9/2001 |
| JP | 2003 66473 | 3/2003 |
| JP | 2003 149646 | 5/2003 |
| JP | 2003 177430 | 6/2003 |
| JP | 2005 49386 | 2/2005 |

* cited by examiner (a)

(b)

LIQUID CRYSTAL DISPLAY DEVICE USING NEMATIC LIQUID CRYSTAL AND ALIGNMENT LAYER FAVORABLE FOR LOW POWER CONSUMPTION

TECHNICAL FIELD

Present invention relates to a liquid crystal display device and, in particular, to a liquid crystal display device using nematic liquid crystal material with low power consumption which provides a high resolution image.

BACKGROUND ART

Conventionally, liquid crystal display devices using nematic liquid crystals are mainly utilized as the display device for mobile terminals such as cellular phones, because of their low driving voltage as well as low power consumption characteristics, and their production increases with recent rapid propagation of mobile terminals.

At the same time, higher display functions such as the increase of the number of pixels as well as the number of characters has been required.

On the other hand, it is also important to comply not only with the requirement for advanced display functions such as higher resolution, but also with the requirement for low power consumption, because there is a strong requirement to maintain or extend the continuous operation time for the battery of mobile apparatus.

As one of technologies to fulfill such requirements, several methods intended to develop so-called display memory characteristics are proposed for liquid crystal display device wherein contents of the display is maintained even in the case that the power is shut off. Using the memory characteristics, it is possible to reduce the power consumption substantially to zero in principle when the contents of the display are not changed, and it is also possible to reduce the power consumption by changing the contents of the display on pixel basis by applying voltage only on pixels in which the contents of the display is changed.

Furthermore, as has been well known in the case of conventional passive matrix driving system by twisted nematic (TN) or super twisted nematic (STN) mode, the upper limit of the number of pixels is determined by the limitation of a duty ratio. The use of the memory characteristics removes the limit of the number of pixels and enables a display with high resolution.

As related arts realizing the display memory characteristics using nematic liquid crystals, for example, a method combining a nematic liquid crystal and a liquid crystal alignment layer subjected to a fine grating fabrication process (see patent document 1), and a method by the present inventors in which a nematic liquid crystal and domains having a plurality of in-plane liquid crystal anchoring directions on a substrate are arranged in a patterned form (see patent document 2), are proposed.

Patent document 1: Japanese Unexamined Patent Application Publication No. 11-513809.

Patent document 2: WO 02/06887.

DISCLOSURE OF INVENTION

The conventional method of combining a nematic liquid crystal and a liquid crystal alignment layer subjected to a fine grating fabrication process described above is based on the switching between a homeotropic (vertical) alignment and a hybrid alignment using a flexoelectric effect. However, the method has several problems such as the surface shape in the fine grating fabrication process. Further, the anchoring strength of the liquid crystal alignment on the surface should be accurately controlled in a limited range. Therefore, the practical application of this method has not been achieved yet.

Another conventional method, wherein a nematic liquid crystal and domains having a plurality of liquid crystal in-plane anchoring directions of the liquid crystal alignment on a substrate are arranged in a pattern, is based on the switching between memory states by an electric field substantially parallel to the substrate plane (transverse electric field). Therefore, the method requires more than a set of a pair of comb electrodes being used in an in-plane switching system which necessitates a complex fabrication process for the electrode.

As has been described above, it is difficult by a conventional art to easily produce a liquid crystal display device having the display memory characteristics which is favorable for low power consumption and for high resolution image with nematic liquid crystal materials with a high yield.

Considering the above described situations, the object of the present invention is to provide a liquid crystal display device using nematic liquid crystal materials, which has a display memory characteristics for low power consumption, and also can be easily fabricated with a high yield.

In order to achieve the above described object, the present invention is characterized by;

[1] a liquid crystal display device using nematic liquid crystal material, comprising a pair of substrates wherein at least one substrate is transparent, plate-like electrode layers formed on surface of the pair of substrates respectively wherein at least one of the plate-like electrode layers is transparent, a liquid crystal layer interposed between the pair of substrates wherein an electric field is imposed therethrough by applying a voltage on the plate-like electrode layers, and an alignment layer arranged between the liquid crystal layer and at least one substrate of the pair of substrates and comprising alignment domains processed for liquid crystal anchoring treatment in a plurality of different directions including a substantially vertical and a substantially horizontal direction to the surface of the substrate;

[2] a liquid crystal display device using nematic liquid crystal material as described in [1], wherein a material forming the alignment layer being arranged on at least one substrate of said pair of substrates comprises a photo reactive material, and at least one processing method for the liquid crystal anchoring treatment in a plurality of different directions is the processing with light irradiation to induce a chemical reaction to the material forming the alignment layer;

[3] a liquid crystal display device using a nematic liquid crystal as described in [1] or [2], wherein the liquid crystal layer comprises a liquid crystal material being capable of showing positive or negative sign with respect to dielectric anisotropy thereof depending on frequency of an applied alternating electric field;

[4] a liquid crystal display device using a nematic liquid crystal as described in [1], [2], or [3], wherein at least one substrate of the pair of substrates is provided with a polarizing plate;

[5] a liquid crystal display device using nematic liquid crystal material as described in [1], [2], [3] or [4], wherein the liquid crystal layer includes a pigment molecule having an absorption dichroism as a constituent;

[6] a liquid crystal display device using nematic liquid crystal material as described in [1], [2], [3], [4] or [5], wherein a light reflector is arranged on the surface of at least one substrate of the pair of substrates; and

[7] a liquid crystal display device using nematic liquid crystal material as described in claim [1], [2], [3], [4], [5] or [6], wherein said substantially horizontal direction to the surface of the substrate of said alignment domains is different from one another in a plurality of sub-pixel regions (pixel domains) in a pixel.

Namely, a pair of simple plate-like electrodes opposing each other is used in the present invention similarly to the ordinary TN mode, in stead of comb electrode which necessitate a complex electrode formation process.

In order to realize a plurality of orientation states of liquid crystal having a memory effect, which can be switched with a vertical electric field, an alignment layer composed of alignment domains subjected to the anchoring treatment of the liquid crystal alignment in a plurality of different directions is used.

In the absence of the applied voltage and in the absence of imposed electric field across a liquid crystal layer, the total energy of liquid crystal orientation state is represented by the sum of the elastic deformation energy of the liquid crystal layer itself and the anchoring energy based on the interfacial interaction between the liquid crystal layer and the alignment layer formed on the surface of the substrate. Therefore, a plurality of orientation states in the liquid crystal layer can be made stable with respect to memory effect, using the surface of the substrate in which a plurality of alignment directions on the surface of the substrate is equally energetically stable enough.

Furthermore, in order to achieve the switching between a plurality of orientation states by the vertical electric field using the plate-like electrodes opposing each other, a plurality of the anchoring directions of the liquid crystal alignment in respective alignment domains may have a substantially vertical direction to a substrate surface and a substantially horizontal direction to the substrate surface.

BEST MODE FOR CARRYING OUT THE INVENTION

The liquid crystal display device using nematic liquid crystal of the present invention includes a pair of substrates wherein at least one substrate is transparent, plate-like electrode layers formed on surface of the pair of substrates respectively wherein at least one layer is transparent, a liquid crystal layer interposed between the pair of substrates wherein an electric field is imposed therethrough by applying a voltage on the plate-like electrode layers, and an alignment layer arranged between the liquid crystal layer and at least one substrate of the pair of substrates. The alignment layer comprises alignment domains processed for liquid crystal anchoring treatment in a plurality of different directions including a substantially vertical and a substantially horizontal direction to the surface of the substrate.

EMBODIMENTS

The preferred embodiments of the present invention are described below in detail.

Figure 1:
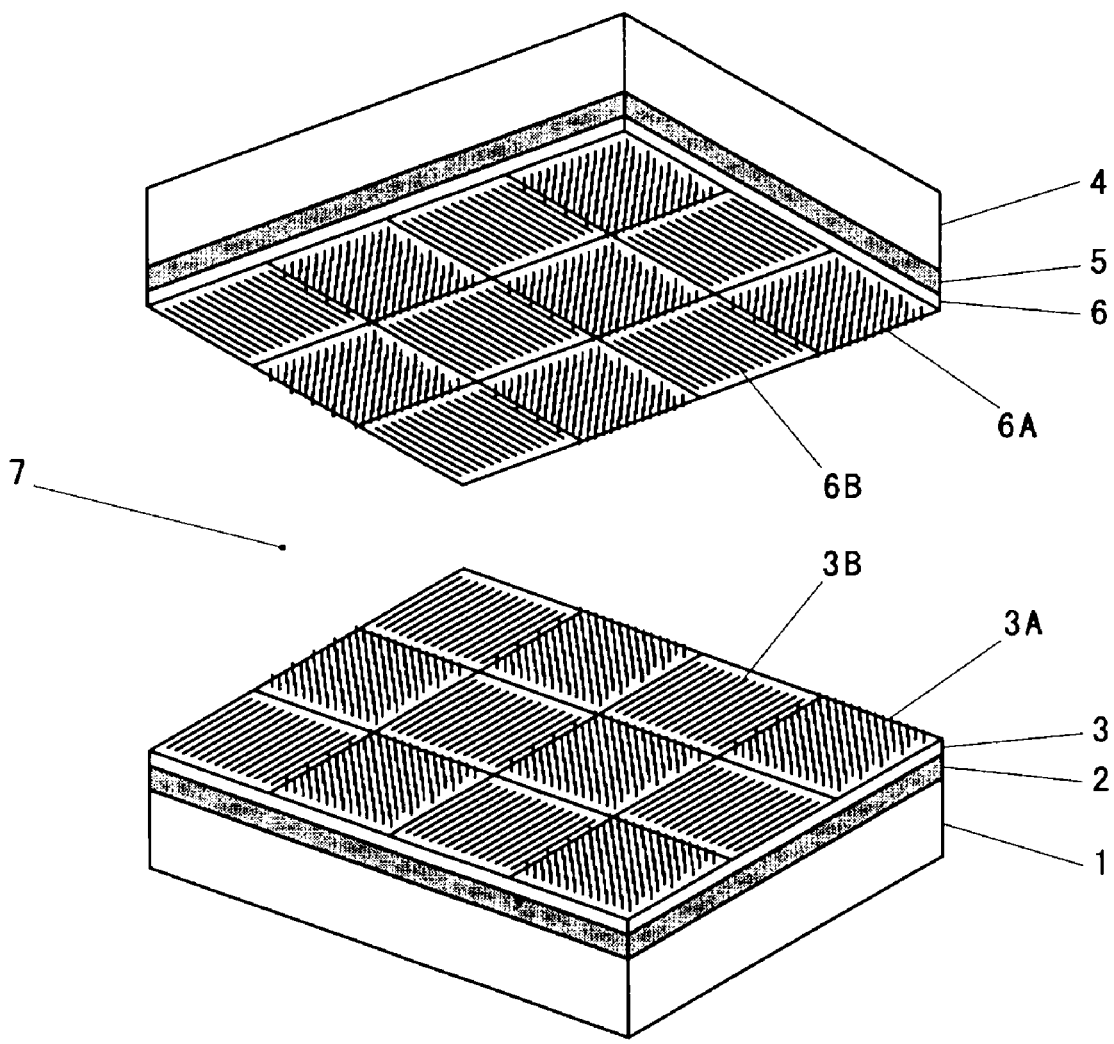
FIG. 1 shows a pattern of anchoring treatment on the substrate of liquid crystal display devices using nematic liquid crystal according to a first embodiment of the present invention.

FIG. 1 is a perspective view showing the formation of an alignment layer on the substrates of a liquid crystal display device using nematic liquid crystal according to a first embodiment of the present invention, and showing that an upper substrate is opposing to a lower substrate.

In FIG. 1, 1 is a substrate (lower substrate), 2 is a plate-like electrode layer formed on the substrate 1, and 3 is an alignment layer formed on the plate-like electrode layer 2. The alignment layer 3 has a plurality of alignment domains in checker-board like pattern, and each domain is subjected to liquid crystal anchoring treatment to form an alignment domain 3A having liquid crystal anchoring direction substantially vertical to the substrate surface or an alignment domain 3B having liquid crystal anchoring direction substantially horizontal to the substrate surface.

If the size of the alignment domains 3A and 3B arranged in the above described checker-board like pattern is regulated to small sizes ranging from several submicrons to several microns, the orientation of liquid crystal molecules aligned by the alignment layer 3 does not correspond to the alignment patterns but takes a uniform orientation state, because of an elastic character of the nematic liquid crystal itself.

Considering the case that the anchoring force of the liquid crystal alignment in substantially horizontal and substantially vertical directions are equivalent and that the shapes of the respective alignment domains 3A and 3B are the same, the substantially vertical and the substantially horizontal alignments are regarded to be energetically equivalent and equally stable in the substantially uniform surface alignments induced by the alignment layer 3.

Then another substrate having a similar alignment layer is prepared and two substrates are arranged in a manner that the surfaces of the alignment layer side of both substrates are opposed to each other. In FIG. 1, 4 is a substrate (upper substrate), 5 is a plate-like electrode layer formed on the substrate 4, and 6 is an alignment layer formed on the plate-like electrode layer 5. An alignment domain 6A having liquid crystal anchoring direction substantially vertical to the substrate surface and an alignment domain 6B having liquid crystal anchoring direction substantially horizontal to the substrate surface are formed in a checker-board like pattern on the alignment layer 6. A cell is configured by providing a gap between the alignment layers 3 and 6 opposing each other. The size of the gap is, for example, about 10 microns which is larger than the sizes of the alignment domains 3A and 3B (submicrons to several microns). A nematic liquid crystal material is introduced between the substrates 1 and 4 (alignment layers 3 and 6) to form a liquid crystal device with a liquid crystal layer 7.

Plate-like electrode layers 2 and 5 including a transparent electrode material are formed on the substrate 1 and 4, and therefore it is possible to impose a vertical electric field across the liquid crystal layer 7 by applying a voltage between the plate-like electrode layers 2 and 5 provided on each substrate 1 and 4 opposing each other in the liquid crystal cell configured as above.

Figure 2:
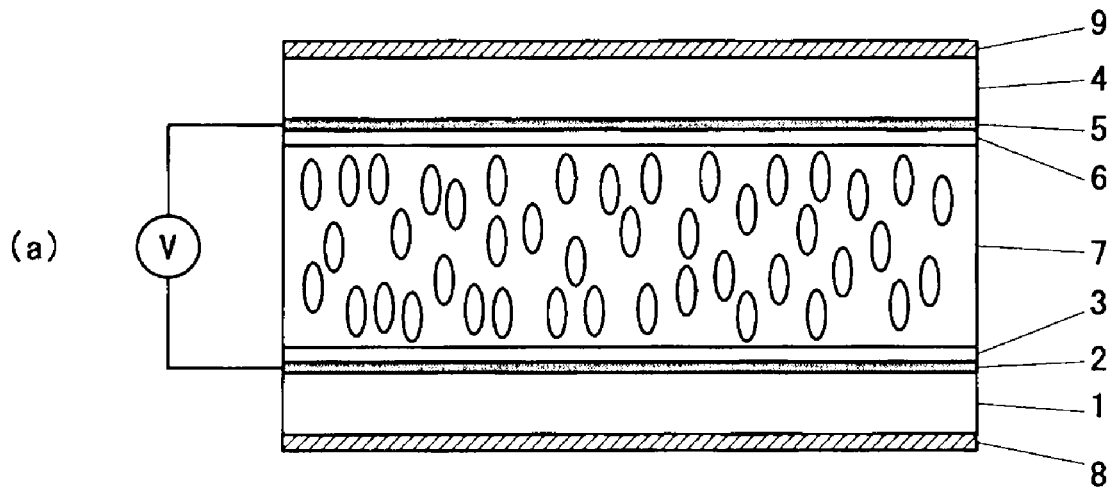
FIG. 2 shows a schematic view of two stable liquid crystal orientation states of a liquid crystal display device using nematic liquid crystal and a view of the switching between the two stable orientation states according to the first embodiment of the present invention.
Figure 2:
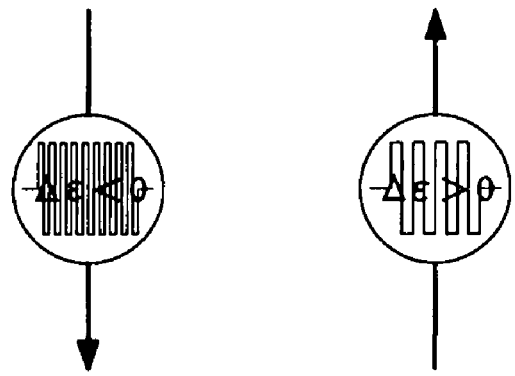
Figure 2:
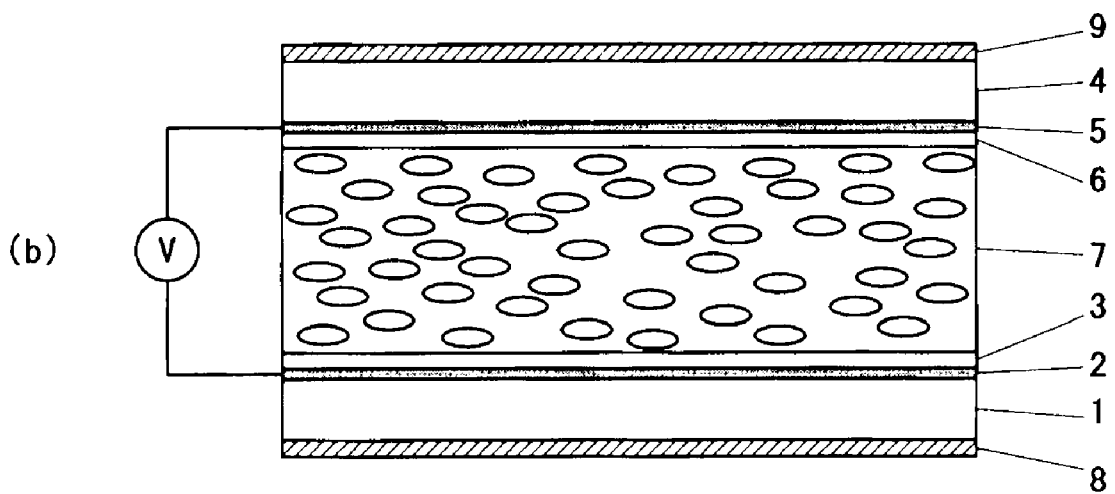

As shown in FIG. 2, it is possible to realize the switching between the two energetically equivalent stable states, i.e., the substantially vertical state [FIG. 2(*a*)] and the substantially horizontal state [FIG. 2(*b*)], by using a liquid crystal material that can take positive or negative sign with respect to its dielectric anisotropy depending on a frequency of an alternating electric field.

In order to avoid the deterioration of display quality due to the generation of domains with different rotational directions for the liquid crystal alignment by the application of an electric field when switching between the two states, it is preferable to incline the substantially vertical alignment direction to the substrate surface in a particular direction, for example, by 3 degrees, and similarly to raise the substantially horizontal alignment direction to the substrate surface in a particular direction, for example, by 3 degrees from the substrate surface, that is, to carry out so-called a pretilt control.

In order to obtain such alignment layers (alignment layer 3 and alignment layer 6) with a checker board like pattern of the vertical and the horizontal anchoring, it is preferable to use, for an example, an alignment layer material with photo reactivity.

As for such an alignment layer material, for an example, poly[2-(4-phenylazophenyloxy)ethyl methacrylate] is known (see reference document 1, Ichimura et al., Appl. phys. Lett., Vol. 73, pp 921-923). The spin cast thin film of this polymer on a substrate forms a vertical alignment layer. However, when the polymer is irradiated by an unpolarized light with a wavelength of 365 nm from the direction inclined at 60 degrees from substrate surface with an enough irradiation energy, it has been reported that a horizontal alignment film having an anchoring direction in this inclined direction (that is, having a pretilt angle with a few degrees) is obtained (see the above reference document 1).

After a thin film of the photo reactive polymer is formed on the surface of the substrate 1 to form a vertical alignment layer, an unpolarized light having a wavelength of 365 nm with an enough irradiation energy is irradiated from an inclined angle of 60 degrees from the substrate surface using a photo mask having a checker board pattern with the same pattern size as the alignment domain 3A and 3B (or 6A and 6B). The checker board pattern of the photo mask which corresponds to the horizontal alignment domain 3B (or 6B) transmits the light, while the checker board pattern which corresponds to the vertical alignment domain 3A (or 6A) does not transmit the light, then only the part of the alignment layer 3 (or the alignment layer 6) under the checker board pattern of the photo mask corresponding to the horizontal alignment domain 3B (or 6B) is converted to a horizontal alignment layer having an anchoring direction in this inclined direction of the irradiation light (that is, having a few degrees of pretilt angle).

In this way, a liquid crystal display device wherein two orientation states of the liquid crystal, that is, a substantially vertical orientation state as shown in FIG. 2(*a*) and a substantially horizontal orientation state as shown in FIG. 2(*b*) are both stable in the absence of an electric field and have a memory characteristic, and the switching between these stable orientation states is possible by the vertical electric field generated by applying a voltage between a pair of plate-like electrode layers 2 and 5 formed on the respective substrate opposing each other, could be obtained.

The liquid crystal device operates as a display device, for example, by interleaving the liquid crystal device with two polarizing plates 8 and 9 in such a way that the each polarizing transmission axes crosses at right angles to each other. At this time, it is possible to display a black color with the substantially vertical orientation state shown in FIG. 2(*a*) and a white color with the substantially horizontal orientation state shown in FIG. 2(*b*) due to a birefringent effect by changing the anchoring direction of the alignment layer 3 and 6 from a substantially horizontal alignment to a substantially intermediate direction (the direction of 45 degrees) of the transmission axes of polarizing light crossed each other. In order to increase the transmittivity of the white display in the substantially horizontal orientation state, it is preferable to set the retardation of the liquid crystal layer as a half wave plate by controlling the anisotropy of refractive index ($\Delta n$) of the liquid crystal material and the thickness of the liquid crystal layer.

It is also possible obtain a display device using so-called "guest-host effect" by introducing a pigment molecule having an absorption dichroism into the liquid crystal material as a component or to construct a reflection type display device utilizing the plate-like electrode layer of one substrate as an opaque electrode layer which also acts as a reflector.

Figure 3:
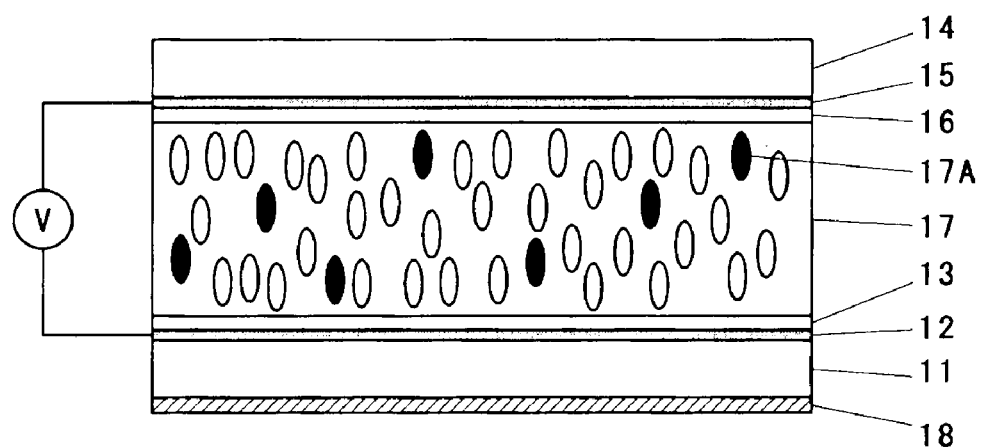
FIG. 3 shows a configuration diagram of a liquid crystal display device using nematic liquid crystal according to a second embodiment of the present invention.

FIG. 3 is a view showing the configuration of a liquid crystal display device using nematic liquid crystal according to a second embodiment of the present invention.

In this figure, two transparent glass plates with 1.1 mm thickness with polished surfaces are used as a substrate 11 and a substrate 14.

A transparent electro-conductive layer composed of indium tin oxide (ITO) is formed on the substrate 11 as a plate-like electrode layer 12.

Next, a fine vertical alignment layer 13 is obtained on the electrode layer 12 after applying and drying a solution of a material for the alignment layer, poly[2-(4-phenylazophenyloxy)ethyl methacrylate] having azobenzene moiety on the substrate 11.

Photo-sensitive material used here is not limited to the above described polymer, but any material may be used if it has a similar anchoring effect and has also an ability of changing the anchoring level under ultra-violet irradiation.

As a photo-sensitive material, for an example, a polyimide type material for the alignment layer, RN-1338, produced by Nissan Chemical Industries, Co. Ltd. is also applicable to the present invention. Similarly to the above described azobenzene material, this material RN-1338 forms a vertical alignment layer when it has been spin cast on a substrate as a thin film, while it is converted to a horizontal alignment layer with the anchoring direction in right angle with the polarized plane of the incident light by irradiating with a linearly polarized light having 250 nm wavelength having enough irradiation energy.

Next, an unpolarized ultraviolet light is irradiated using a mercury-xenon lamp as a light source provided with a band pass filter having a central wavelength of 365 nm from an inclined angle of 60 degrees from substrate surface with a light intensity of about 0.2 J/cm$^2$. The light irradiation is performed through a photo mask with a square checker board pattern as shown in FIG. 1, in which the size of the partitioned small area is 1 μm$^2$, and then a horizontal alignment layer having the anchoring direction in the plane of inclined irradiated light (with pretilt angle of about 5 degrees) is formed in the parts only where the light is transmitted through the photo mask.

Above described pattern shape and intensity of irradiated light are only examples and it is preferable to adjust them according to the photo sensitive materials to be used and the characteristics of liquid crystal materials. For example, if there is a large difference in the anchoring force between resulting vertical and horizontal alignment layers depending on the alignment layer materials to be used, it is preferable to change the amount of the area of the checker board pattern corresponding to white and black colors relatively to adjust the resulting anchoring force multiplied by the area to be nearly equivalent between the vertical and horizontal alignment.

As for another substrate 14, a plate-like electrode layer 15 and an alignment layer 16 are also formed quite similarly to the substrate 11.

Next, the surfaces of the two substrates 11, 14 having an alignment anchoring ability are arranged to oppose each other and a cell is constructed by mediating a spacer including dispersed spherical polymer beads and a sealing material in peripheral part of the substrates.

Next, a liquid crystal composition including a liquid crystal material MLC-2048 of Merck Co. Ltd. mixed with an appropriate quantity of a neutral pigment material D85E63 of BDH Co. Ltd. as a dichroic pigment 17A is injected in vacuum between the substrates of the liquid crystal cell to form a liquid crystal layer 17, and the cell is sealed with a sealing material of an UV-curing resin to obtain a liquid crystal panel.

The liquid crystal composition MLC-2048 is a nematic composition used for two frequencies driving with crossover frequency of 23 kHz in which the dielectric anisotropy ($\Delta\in$) is positive for low frequencies and negative for high frequencies.

The thickness of the liquid crystal layer after injection of liquid crystal is adjusted to be 10 µm by the spacer.

Next, a polarizing plate 18 (G1220DU, Nitto Denko, Co. Ltd.) is attached on the light source side of the substrate 11 so that its transmission axes of polarized light is in parallel to the horizontal anchoring direction of the substrate 11.

Then, a liquid crystal display device is obtained after connecting a driving circuit enabling two frequencies driving and a light source for a back light and the like.

The relationship between the wave form of driving voltage and an electro-optic characteristic of the liquid crystal display device using nematic liquid crystal according to the second embodiment is illustrated below using FIG. 4.

Tr in FIG. 4(a) represents the variation of transmitivity of the liquid crystal display device in accordance with the variation of the wave form of driving voltage. V in FIG. 4(b) represents the wave form of the driving voltage applied between ITO electrodes 12 and 15.

As shown in these figures, in the liquid crystal display device in accordance with the present embodiment, a switching between the orientation states of the liquid crystal in the liquid crystal layer corresponding to bright state [see FIG. 2(a)] and dark state [see FIG. 2(b)] becomes possible using a guest-host effect of a dichroic pigment 17A by the selective variation of the frequency of driving AC voltage.

Next, a third embodiment of the present invention is illustrated below.

Figure 5:
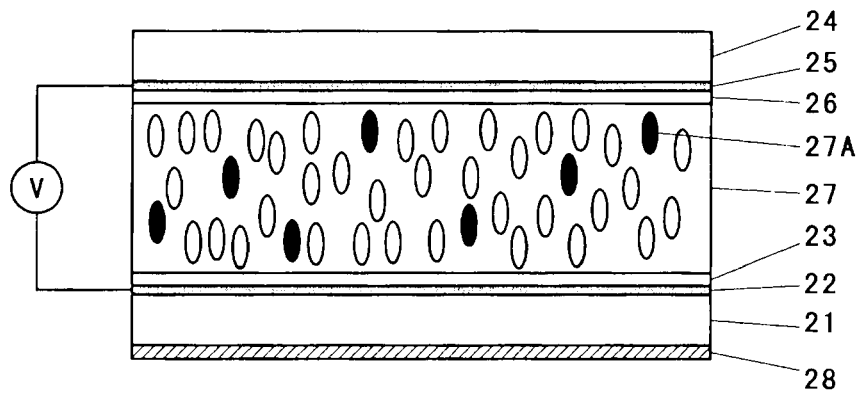
FIG. 5 shows a configuration diagram of the liquid crystal display device according to a third embodiment of the present invention.

In the third embodiment, referring to FIG. 5, a reflector type liquid crystal display device includes a plate-like electrode layer 25 formed on the substrate 24 opposing to substrate 21, plate-like electrode layer 22 and alignment layer 23, and the plate-like electrode layer 25 also acts as a reflector. The fabrication of an alignment layer 26 on the substrate 24 is carried out by simple coating and drying in a similar way with the second embodiment except that any inclined irradiation of an ultraviolet light is not performed.

In this third embodiment, the alignment layer 26 operates as a uniform vertical alignment layer because the layer is not irradiated with an ultraviolet light.

Figure 6:
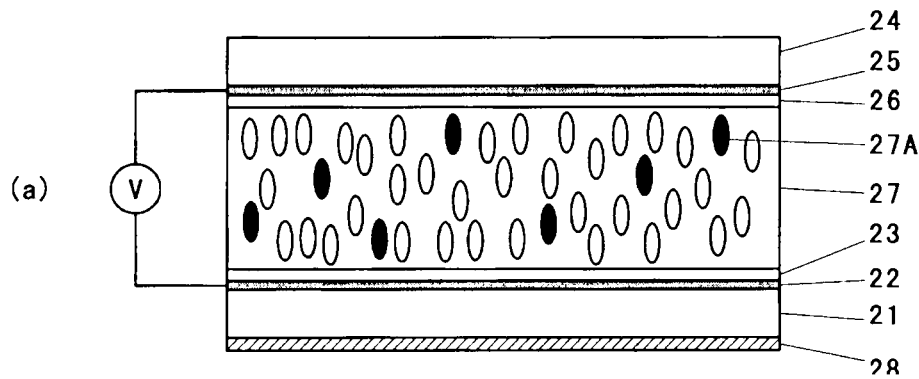
FIG. 6 shows a wave form of driving voltage and an electro-optic characteristic of the liquid crystal display device using nematic liquid crystal according to the third embodiment of the present invention.
Figure 6:
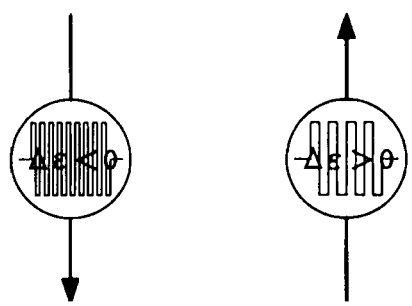
Figure 6:
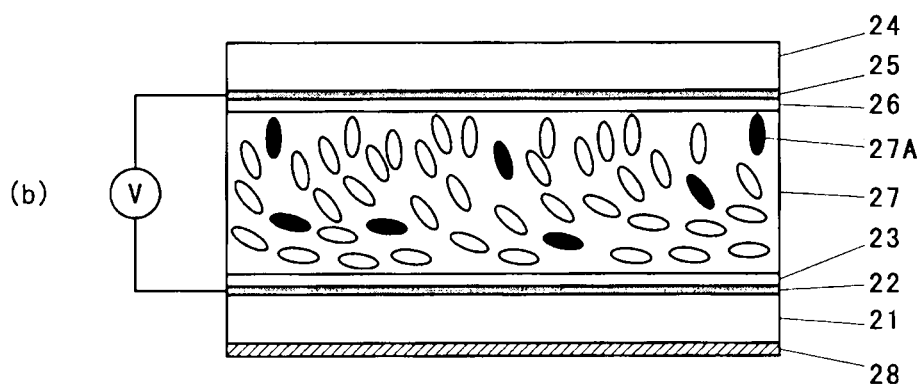

FIG. 6 is a schematic view showing the two memory stable states of liquid crystal orientation and the switching between two stable orientation states with memory effect in accordance with this embodiment. As shown in this figure, the two stable orientation states with memory effect is a vertical orientation state shown in FIG. 6(a), and a so-called hybrid orientation state shown in FIG. 6(b), because the alignment layer 26 is a vertical alignment layer.

The light absorption by a dichroic pigment 27A in the latter hybrid orientation state is about a half of the horizontal orientation state of the second embodiment [see FIG. 2 (b)]. However, the configuration of the device is a reflection type in the third embodiment, therefore, the light transmitted through the liquid crystal device passes the liquid crystal layer twice, that is, at the moment of incidence and reflection, then the total light absorption (accordingly also the contrast) is nearly the same as in the case of the second embodiment.

Figure 4:
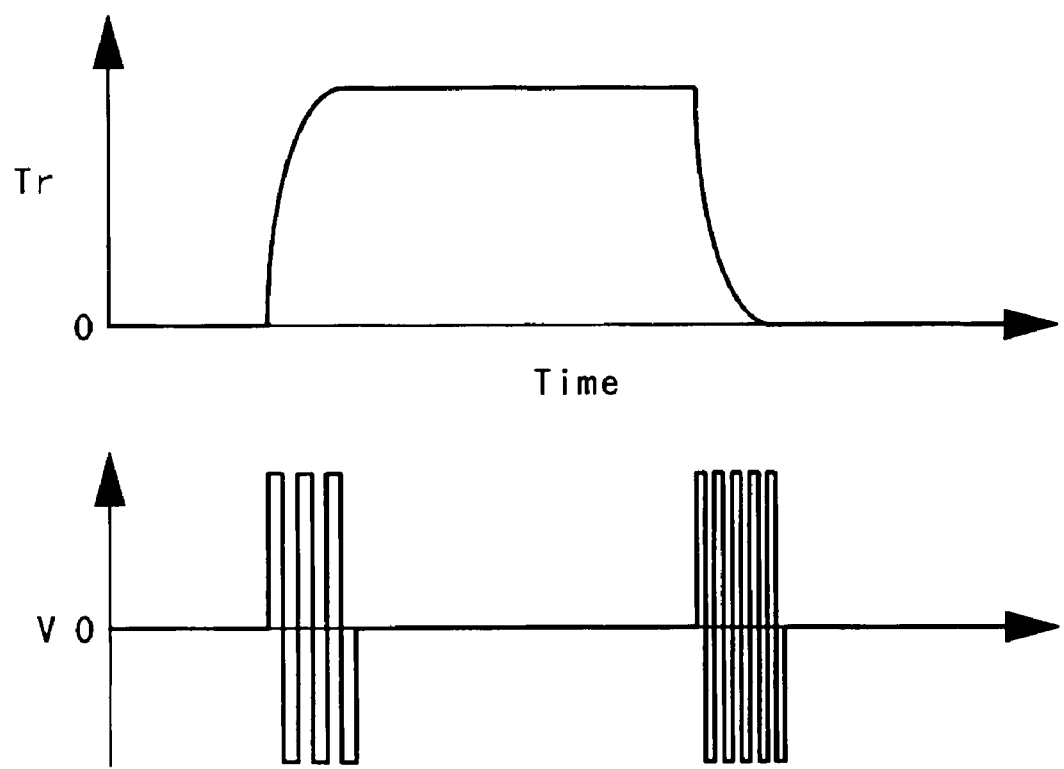
FIG. 4 shows a wave form of driving voltage and an electro-optic characteristic of the liquid crystal display device using nematic liquid crystal according to the second embodiment of the present invention.

Accordingly, the electro-optical characteristic of this third embodiment is nearly the same as that of the second embodiment illustrated in FIG. 4.

In the third embodiment, the required number of steps for the production of the liquid crystal display device can be reduced because the irradiation of inclined ultraviolet light is only required for the alignment layer 23 on the substrate 21 side.

Furthermore, in the third embodiment, it is possible to improve viewing angle characteristics using a so-called multi-domain pixel configuration. In the configuration, the anchoring direction substantially horizontal to the substrate surface in alignment domains of alignment layer 23 is replaced by a plurality of different directions in on the a plurality of sub-pixel regions (pixel domains) in a pixel. In the pixel domains, for example, in the case that an original pixel is divided into two sub-pixels, the size of a new pixel domain is the half of the original pixel (conventionally, one side is several 10 µm to 110 µm) and a large number of alignment domains with the size of about 1 µm square are included in the large pixel domains.

The present invention is not limited within above embodiments, and various modifications are possible according to the object of the present invention, which should not be excluded from the scope of the present invention.

In the above embodiment, a material with a neutral absorption spectral characteristic (black pigment) is used as a dichroic pigment added to liquid crystal material. It is also possible to carry out a color display by adjusting absorption spectral characteristics.

It is also possible to make a configuration without any polarizing plate and the like, by laminating two liquid display devices of the second embodiment (rotating one plate with an angle of 90 degrees relative to the other plate).

Furthermore, it is possible to construct a liquid crystal display device provided with active devices such as a thin film transistor and the like on each pixel.

In summary, according to the present invention, it is possible to easily fabricate a liquid crystal display device using nematic liquid crystal, having a display memory characteristic and low power consumption with a high yield.

INDUSTRIAL APPLICABILITY

The liquid crystal display device of the present invention is easily fabricated with a high yield and it is appropriate for the liquid crystal display device using nematic liquid crystal with a display memory characteristic and low power consumption.

The invention claimed is:

1. A liquid crystal display device using nematic liquid crystal material, comprising:
    (a) a pair of substrates, at least one of the substrates being transparent;
    (b) plate-like electrode layers formed on surface of the pair of substrates respectively, at least one of the plate-like electrode layers being transparent;
    (c) a liquid crystal layer interposed between said pair of substrates, wherein an electric field is imposed therethrough by applying a voltage on the plate-like electrode layers; and
    (d) an alignment layer arranged between the liquid crystal layer and at least one substrate of the pair of substrates, the alignment layer comprising alignment domains processed for the liquid crystal anchoring treatment in a plurality of different directions including a substantially vertical and a substantially horizontal direction to the surface of the substrate,
    (e) wherein the liquid crystal display device has two liquid crystal orientation states both formed in a checker board like pattern of a substantially vertical orientation state and a substantially horizontal orientation state to the surface of the substrate, each state being stable and having a memory characteristic in the absence of the electric field.

2. The liquid crystal display device using nematic liquid crystal material according to claim 1, wherein a material forming the alignment layer arranged on at least one substrate of the pair of substrates comprises a photo reactive material, and at least one processing method for the liquid crystal anchoring treatment in a plurality of different directions is the processing with light irradiation to induce a chemical reaction to the material forming the alignment layer.

3. The liquid crystal display device using nematic liquid crystal material according to 1 or 2, wherein the liquid crystal layer comprises a liquid crystal material being capable of showing positive or negative sign with respect to dielectric anisotropy thereof depending on frequency of an applied alternating electric field.

4. The liquid crystal display device using nematic liquid crystal material according to claim 1, further comprising a polarizing plate on at least one substrate of the pair of substrates.

5. The liquid crystal display device using nematic liquid crystal material according to claim 1, wherein the liquid crystal layer comprises a pigment molecule having an absorption dichroism as a constituent.

6. The liquid crystal display device using nematic liquid crystal material according to claim 1, further comprising a light reflector arranged on at least one substrate of the pair of substrates.

7. The liquid crystal display device using nematic liquid crystal material according to claim 1, wherein the substantially horizontal direction to the surface of the substrate of the alignment domains is different from one another in a plurality of sub-pixel regions (pixel domains) in a pixel.

* * * * *